United States Patent Office 2,820,051
Patented Jan. 14, 1958

2,820,051

MONO-CYANOETHYLATED 2-NITROANILINE

Saul R. Buc, Easton, Pa., assignor to General Aniline & Film Corporation, New York, N. Y., a corporation of Delaware No Drawing. Application April 10, 1956
Serial No. 577,199

1 Claim. (Cl. 260—465)

The present invention relates to a process of monocyanoethylating 2-nitroaniline.

It is known that organic amines, such as aniline, p-nitroaniline, p-chloroaniline, etc. can add to acrylonitrile to form compounds containing a $\beta$-cyanoethyl group. This reaction, which is known as cyanoethylation, is generally conducted under acidic conditions in the presence of inorganic catalysts. In this reaction, the amine is refluxed with acrylonitrile and acetic acid in the presence of cuprous chloride. Under these conditions, p-nitroaniline gives the mononitrile derivative in a 6% yield. The o-substituted amines largely resist formation of the bis (cyanoethyl) derivative, probably because of steric effects.

I have found that under basic conditions, o-nitroaniline readily monocyanoethylates, whereas p-nitroaniline dicyanoethylates. Accordingly, it is an object of the present invention to provide a novel process of monocyanoethylating 2-nitroaniline. Other objects and advantages will become manifest from the following description.

The foregoing objects are readily accomplished by condensing one mole of 2-nitroaniline with one mole of acrylonitrile in the presence of an inert solvent-diluent, such as dioxane and in the presence of an alkaline condensing agent, such as trimethylbenzyl ammonium hydroxide. The amount of alkaline condensing agent is not critical, and may range from 5 to 50 parts per 100 parts of acrylonitrile. Likewise, the amount of inert solvent-diluent is immaterial so long as a sufficient amount is employed to permit stirring of the reactants. Further details regarding the condensation reaction will become fairly manifest from the following example:

*Example*

In a stirred flask there were charged 138 grams of 2-nitroaniline, 400 ml. of dioxane, and 5 ml. of trimethylbenzyl ammonium hydroxide. The charge was stirred until dissolved, and then to it were added slowly 300 ml. of acrylonitrile. The temperature rose slowly to 40° C. The condensation reaction was maintained at this temperature by cooling during the addition of the acrylonitrile. When the addition was finished, the reaction mixture was permitted to stand overnight at room temperature. The trimethylbenzyl ammonium hydroxide was destroyed by the addition of a sufficient quantity of acetic acid, and the dioxane distilled in vacuum. The residue was taken up in 1200 ml. of boiling ethylene dichloride and filtered while hot. On chilling the filtrate, a large group of bright orange crystals were obtained. The crystals had a melting point of 112–114° C. The yield ranged between 37% and 100%.

An analytical sample was prepared by crystallization from ethylene chloride, and analysis showed it to be the monocyanoethylated product calculated $C_9H_9N_3O_2$: C=56.54%, H=4.75%. Found: C=56.50%, H=4.78%.

It is interesting to note that on attempting to cyanoethylate 3-nitroaniline by the foregoing procedure there was no spontaneous temperature rise, and the starting materials were recovered unchanged.

75 grams of the monocyanoethylated 2-nitroaniline were added gradually with stirring to a suspension of 75 grams of iron filings in 225 ml. of water containing 1.0 ml. of acetic acid of 90° C. When the addition was complete and heat was no longer evolved the mixture was neutralized with excess calcium carbonate and filtered.

It is to be noted that in the reduction of the nitro product of the foregoing example to the corresponding amine, iron may be replaced by 1.5 molecular equivalents of sodium sulfide, sodium hydrosulfide, ammonium sulfide, and the like, in aqueous suspension at a temperature of 70–100° C. for a period of time ranging from one-half to 1½ hours. The reaction was allowed to cool to room temperature and the amine derivative isolated. Instead of sodium sulfide, sodium hydrosulfide, ammonium sulfide, etc. an equivalent amount of glucose or other reducing sugar may be used, and the reaction conducted in aqueous alkaline suspension at a temperature of 65–75° C. for about one-half to one hour. The mono-cyanoethylated aminoaniline is valuable as an intermediate in the preparation of anthraquinone dyes. For example, the intermediate may be condensed with 4,5-dinitrochrysazine or 4,8-dinitroanthrarufin by refluxing in the presence of an inert solvent, such as nitrobenzene and the like in the conventional manner. The resulting dyestuff possesses several times as much affinity, i. e. substantivity, for cellulose acetate than similar dyes prepared by condensing either the 4,5-dinitrochrysazine or 4,8-dinitroanthrarufin with p-aminoacetanilide. The enhanced substantivity to cellulosic fabrics together with excellent light and gas fastness of the dyestuffs prepared while utilizing the intermediate of the present invention has been established to be due to the $\beta$-cyanoethyl group on the nitrogen atom which bears the cyanoethylated radical. The mono-cyanoethylated aniline contributes exceptionally good affinity to cellulosic fibers when dyed with the anthraquinone dyestuffs.

I claim:

A process of preparing mono-cyanoethylated 2-aminoaniline which comprises reacting one mole of 2-nitroaniline with one mole of acrylonitrile in the presence of an inert solvent-diluent and in the presence of trimethylbenzyl ammonium hydroxide followed by the reduction of the nitro product to the corresponding o-amino, mono-cyanoethylated aniline.

References Cited in the file of this patent

UNITED STATES PATENTS

| 1,992,615 | Hoffmann et al. | Feb. 26, 1935 |
| 2,579,580 | Howk et al. | Dec. 25, 1951 |
| 2,768,962 | Krimm | Oct. 30, 1956 |

OTHER REFERENCES

Braunholtz et al.: J. Chem. Soc. (London), pp. 1817–24 (1953).

Pietra: Gazz. Chim. Ital., vol. 86 (1956), pp. 70–76.